Dec. 18, 1945. F. P. SCULLY 2,391,040
SIGNALING NOZZLE
Filed Feb. 14, 1944 3 Sheets-Sheet 1
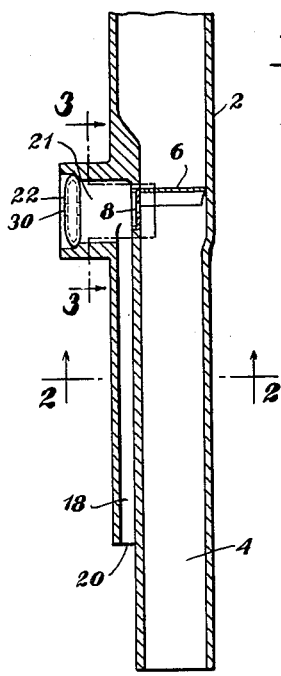
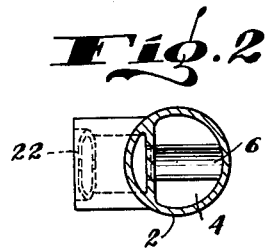
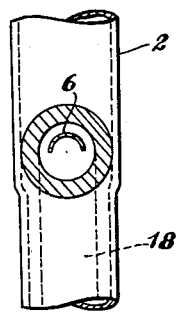
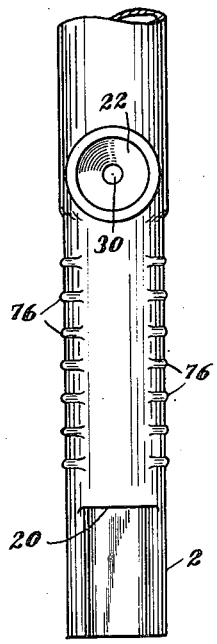
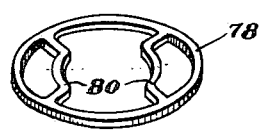
Inventor
Frank P. Scully
C. Yardley Chittick
By
Attorney Dec. 18, 1945.　　　F. P. SCULLY　　　2,391,040
SIGNALING NOZZLE
Filed Feb. 14, 1944　　　3 Sheets-Sheet 2
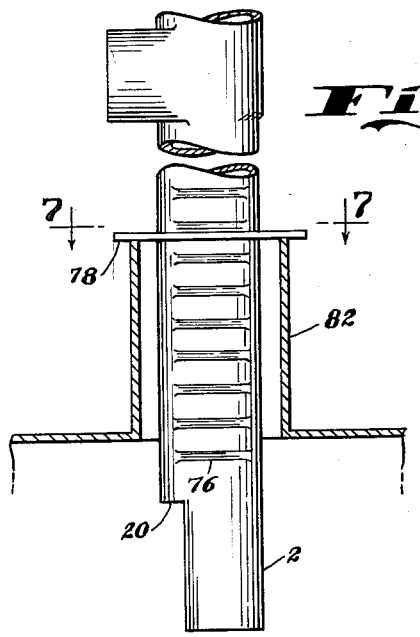
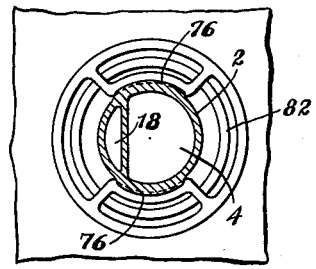
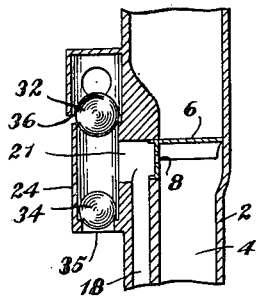
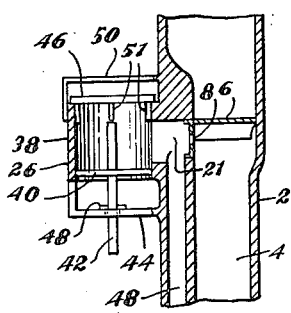
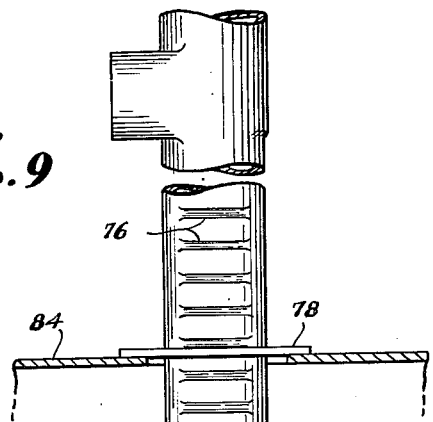
Inventor
Frank P. Scully
Yardley Chittick
Attorney Dec. 18, 1945. F. P. SCULLY 2,391,040
SIGNALING NOZZLE
Filed Feb. 14, 1944 3 Sheets-Sheet 3
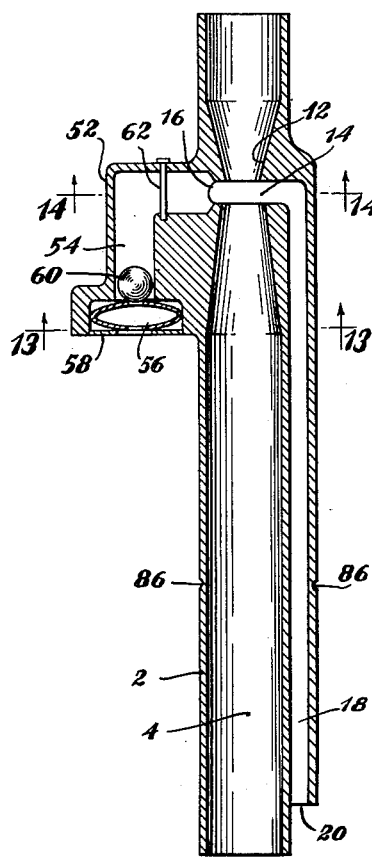
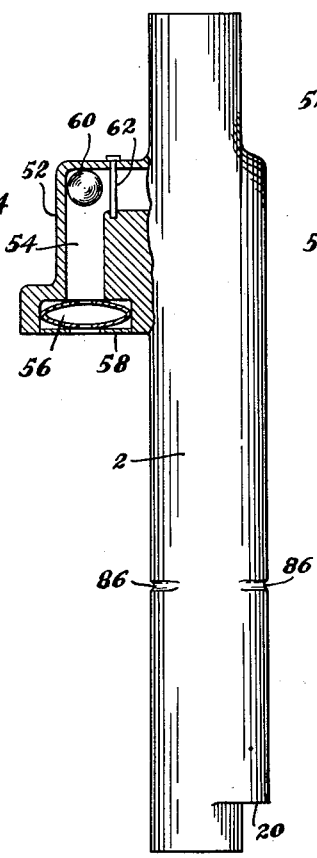
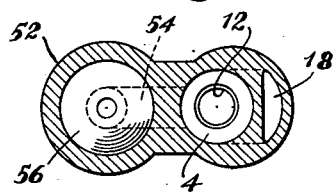
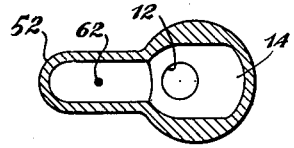
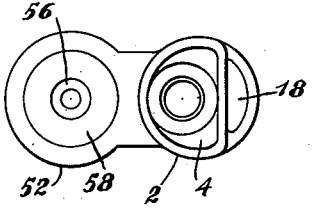
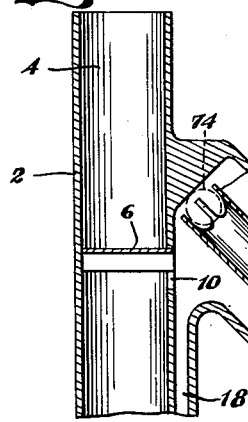
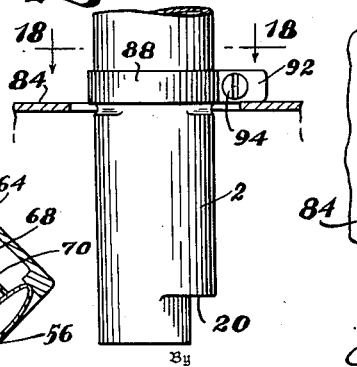
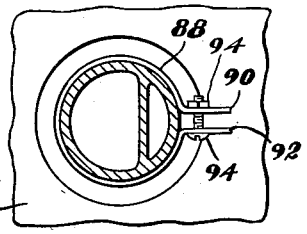
Inventor
Frank P. Scully
Attorney Patented Dec. 18, 1945

2,391,040

UNITED STATES PATENT OFFICE 2,391,040

SIGNALING NOZZLE

Frank P. Scully, Cambridge, Mass., assignor to Scully Signal Co., East Cambridge, Mass., a corporation of Massachusetts Application February 14, 1944, Serial No. 522,255

12 Claims. (Cl. 226—66)

This invention relates to filling tanks with liquid and is particularly concerned with the provision of a filling nozzle which incorporates means for indicating to the operator when the liquid level in the tank has risen to a predetermined level.

By this invention it is intended to incorporate in a single unit a filling nozzle which may be connected to a liquid supply line and a signaling device operated by the flow of liquid through the nozzle and the level of the liquid in the tank or container.

It is further contemplated that the signal may be either of an audible or visual character, or a combination of both.

Through the use of an audible signal, the nozzle may be effectively used in the dark as well as the day time. In certain forms of the invention there are no moving parts, and in others such moving parts as are necessary are wholly contained in a manner that precludes any mechanical failure, so that the nozzle may be used with complete assurance that it will function in the intended manner over a long period.

As will become apparent from the following description and the accompanying drawings, the unit may be made economically and may be incorporated with existing equipment at minimum expense. The nozzle may be used for filling tanks of all sorts, including those of vehicles and airplanes, as well as small portable containers, such, for example, as 5 gallon cans.

Furthermore, the size and number of vents from the container are immaterial to its operation. In fact, the nozzle will signal as intended when used with an open container.

In addition to the signaling feature per se, the nozzle is provided with means for locating it vertically with respect to the container top so that the filling of successive similar container units will proceed to the same extent before the signal is given. This results in filling uniformity for any given setting of the nozzle, provided the operator in charge shuts off the liquid supply promptly after the signal is given.

These and other objects of the invention will become more apparent as the description proceeds with the aid of the drawings, in which:

Fig. 1 is a sectional elevation of one form of the invention.

Fig. 2 is a view on the line 2—2 of Fig. 1.

Fig. 3 is a view along the line 3—3 of Fig. 1.

Fig. 4 is a side elevation looking from the left in Fig. 1.

Fig. 5 is a nozzle locating device.

Fig. 6 shows a nozzle in position on a tank having a filling neck.

Fig. 7 is a view on the line 7—7 of Fig. 6, showing the use of the nozzle locating device.

Fig. 8 shows a nozzle positioned by the locating device through a tank opening.

Fig. 9 shows another type of audible signal.

Fig. 10 shows a combined audible and visual type of signal.

Fig. 11 is a modified form utilizing a different nozzle construction, for creating the suction and controlling the signal.

Fig. 12 is another view of the construction of Fig. 11, showing the whistle in operation.

Fig. 13 is a view on the line 13—13 of Fig. 11.

Fig. 14 is a view on the line 14—14 of Fig. 11.

Fig. 15 is a view looking upward toward the bottom of Fig. 12.

Fig. 16 is a further modification of the signaling structure.

Figs. 17 and 18 show the use of a locating clamp for determining the nozzle position with respect to a tank.

In all forms of the invention as disclosed in the drawings, it is contemplated that the liquid entering the container through the nozzle shall induce a suction through a passage that leads from the nozzle downwardly into the tank any desired distance. When the flow of gas through this passage is cut off by the rising liquid level, then the suction created by the flow of liquid will be great enough to induce an adequate flow of gas through a signaling unit to produce a sound or whistle, thus advising the operator that the liquid level has risen to at least the end of the downwardly extending passage.

The downwardly extending passage may be a separate tube, but preferably it is formed integrally with the nozzle so that the latter may be handled in the usual manner without possibility of damage to the downwardly extending tube or passageway.

The signaling means is preferably a whistle that operates under such pressures as can be created by the flow of liquid through the nozzle. One form of whistle that is satisfactory is the typical button type, which has been extensively used in this field.

Other types of signaling means may be used, such as those shown in Figs. 9 and 10. These constructions rely not on a whistle, but on a chattering sound produced by alternate movement of balls, clappers, or piston-like members. In the construction of Fig. 10, the signal is both audible and visual.

Still other controls for the whistle may be used, as shown in Figs. 11, 12, and 16, in which silence of the whistle is assured by a gravity located ball that rests on the whistle passage until such time as the downwardly extending tube has been trapped and the negative pressure in the whistle passage increased. Through the use of a ball in the manner shown, silence of the whistle until the signal is to be given is assured.

Referring now to the drawings in detail, parts that are common in all of the figures will be given the same number. The nozzle in each case consists of a tubular member 2 having a passage 4 therethrough of sufficient capacity to handle the liquid at the intended filling rate. Each nozzle has means for inducing a suction through an opening in the nozzle wall. In Figs. 1, 9, 10, and 16, a transversely extending baffle 6 is used. This baffle, shown in bottom plan and section in Figs. 2 and 3, may be semi-cylindrical in shape, connected at the side wall immediately over the opening through which it is desired to induce a suction. The opening appears at 8 in Figs. 1, 9, and 10, and at 10 in Fig. 16. In Fig. 11 the suction is induced through the use of a Venturi section 12, from which extend openings 14 and 16 on opposite sides. It will be noted, however, in Fig. 14, that openings 14 and 16 are merely those areas that lead from the nozzle to the associated passageways.

Each nozzle has associated therewith a downwardly extending tube 18, which may terminate at any desired level such as 20 with respect to the lower end of the nozzle. The tube 18 might even extend below the nozzle if it were desired to give the signal when the liquid was at a lower level. In the ordinary case, however, it is preferable to fill the tanks substantially full, and as a consequence, the lower end 20 of the passage 18 will be located, when the nozzle is in position in the tank, at a point near the tank top.

Aperture or opening 8 connects not only with passage 18, but also with passage 21 which leads to the signaling device. In Fig. 1 the signaling device is a whistle; in Fig. 9 it is an oscillating ball unit 24; in Fig. 10 it is a clapper and piston arrangement 26; while in Figs. 11 and 16 a whistle 56, normally closed by a ball or other suitable closure, is used.

The suction created by the baffle 6 or the venturi 12 is insufficient to cause operation of the signaling device so long as passage 18 is open. That is to say, as liquid flows into the container through the nozzle, air will be continuously drawn through opening 8 to mingle with the downflowing liquid. In the construction shown in Fig. 1, the air drawn through opening 8 obviously comes from two sources, passage 18 and whistle opening 30. As long as passage 18 is open, the volume of gas flowing through whistle 22 is insufficient to cause an audible sound, and, as a consequence, no signal is given during the early stages of filling. When, however, the liquid level traps the lower end of passage 18, the flow of gas through whistle opening 30 is instantly increased to such an extent that the whistle then makes an audible sound and the operator is advised that filling has reached the desired level, at which time the liquid supply may then be shut off.

In the construction shown in Fig. 9, the gas during the early stages of filling, flows through passage 18 and opening 8 only, because the weight of balls 32 and 34 is great enough to overcome such suction that tends to be induced through passage 21. When, however, passage 18 is trapped by the rising liquid level, then the suction in passage 21 increases to such an extent that ball 34 is forced upwardly from its seat at such velocity that it strikes ball 32, driving it upward from its seat sufficiently so that air rushes in to passage 21 through openings 35 and 36. The pressure is thus immediately equalized above and below ball 34, so that the latter drops to its original position while ball 32 is likewise descending to its original position. As soon as this occurs, the suction developed at 21 immediately overcomes ball 34 again, causing it to repeat the movement just described. As a result, a continuous chattering of balls 32 and 34 against each other and against the housing in which they run is developed, and this is sufficient to give an audible signal to the operator in the same manner as the whistling signal of the construction of Fig. 1.

In Fig. 10 the construction shown is a variation of that of Fig. 9. Instead of utilizing balls, the cylinder 38 houses a piston 40 which is maintained in proper transverse position by a piston rod 42 slidable in a bearing 44 located below the cylinder. As sufficient negative pressure is induced in passage 21 following the trapping of passage 18, the piston 40 is sucked upwardly so that the upper end of piston rod 42 engages the under side of a gravity-positioned valve member 46, driving it upwardly from its seat on the upper edge of cylinder 26 to permit the entrance of air at the upper end of the cylinder. Air also enters passage 21 from the under side of piston 40, which has risen above the lower edge of passage 21. This immediately equalizes the pressure on both sides of piston 40 so that it falls back to its original position at the bottom of the cylinder. Downward movement of the piston is limited by a cross pin 48 extending through piston rod 42, which cross pin engages the upper side of bearing 44. A cage 50 overlies valve 46, and this plus guide fingers 51 cooperate to induce valve 46 to return to its original position following the descent of piston 40.

The operation of this construction likewise produces a visual signal and a continuous chattering, either of which gives the necessary indication to the operator when the liquid level has trapped the lower end of passage 18. The audible signal is principally relied on, as the operator's attention is attracted better by that type.

The construction shown in Fig. 11 differs from that of Fig. 1 in that means is provided for positively preventing, or at least substantially limiting, the passage of air through the whistle until tube 18 is sealed, and in this way eliminating any possibility of the development of an audible signal prematurely. That is to say, in Fig. 1 some gas will flow through whistle 22 during the early stages of filling, whereas flow of gas in signaling quantities through the whistle in Fig. 11 is prevented.

The construction of Fig. 11 includes the Venturi section 12, a laterally extending housing 52 having a passage 54 leading from the atmosphere to opening 16 into the venturi. At the outer end of passage 54 is positioned a whistle 56, which may be held in place by a cover 58. A small ball 60 is placed in the passage 54 to rest under gravity on the upper whistle opening.

A pin 62 or other stop is positioned at the commencement of the horizontal portion of passage 54, so that the ball 60 will always be in a location where it may drop to its normal position on top of the whistle when insufficient suction is present.

The tube 18 connects with the venturi at 14 at the opposite side from the whistle passage 54. The separation of the two passages is helpful in minimizing the suction in passage 54 before tube 18 is trapped, as there is no velocity head of gas passing by passage 54.

The operation of the construction of Fig. 11 is as follows. During the early stages of filling, gas is sucked up through tube 18 to mingle with the downflowing liquid. The gas flow through passage 54 is limited, because the suction created is insufficient to raise ball 60 from its seat. When the liquid level has risen sufficiently to trap the lower end of tube 18, then the suction in passage 54 increases sufficiently to move ball 60 to the position shown in Fig. 12, whereupon whistling commences. It will be observed that there is adequate clearance between ball 60 and the passage when the ball is in its upper position so that there is no interference with the flow of gas through the whistle and passage 54. While ball 60 does not fit the lower part of passage 54 tightly, still it is close enough so that the suction will be sufficient to drive it upwardly until the effective passage is enlarged as in Fig. 12.

The construction shown in Fig. 16 is a further modification combining features of Figs. 1 and 11. Here the passage 18 and the passage through the whistle merge at the opening 10 leading into the liquid passage 4. Through the use of the ball valve construction, the possibility of premature flow of gas through the whistle is prevented. The construction comprises the passage 18, a housing 64 having a whistle 66 positioned at the open end. Extending upwardly from the inner side of the whistle is a tube or ball guideway 68 which houses a ball 70. The upper end of tube 68 is cut away to form a series of ball-retaining fingers 72 which are spaced in such manner as to prevent the ball from escaping from the upper end of the tube, but at the same time to enable free flow of gas past the ball when it has risen to that point.

Either the Venturi construction of Fig. 11 or the previously disclosed baffle construction may be used to produce the necessary suction. In Fig. 16 the baffle form is shown. The passage 10 may be considerably larger than passage 8 shown in Fig. 1, for the reason that ball 70 will stay in its lower position as shown to prevent premature whistling in spite of the increased negative pressure produced within housing 16 through the use of the larger wall opening 10.

The operation of Fig. 16 is as follows. When passage 18 is trapped by rising liquid level, the suction within housing 64 increases sufficiently to cause ball 70 to move to its upper position as indicated by the dotted line at 74. When in this position, gas is free to flow through whistle 66, tube 68, and past the ball at 74, thereby producing the desired signal.

In all of the constructions it is apparent that the nozzle is completely automatic in operation. The valve constructions, both those which produce the chattering as in Figs. 9 and 10 and those which permit the development of the whistling sound as in Figs. 11 and 16, reset themselves without any attention on the part of the operator. The resulting nozzle made according to this invention is no more cumbersome than the conventional nozzle and gives the desired indication when the liquid level has risen to a point to trap tube 18.

In order to provide easy means for uniformly locating the lower end 20 of tube 18 at a uniform level with respect to a tank or a series of tanks with which the nozzle may be used, as have provided nozzle-locating means, which is shown in Figs. 4, 5, 6, 7, 8, 11, 12, 17, and 18. In Figs. 4, 6, and 8 it will be observed that there are a series of horizontal ribs 76 disposed on opposite sides of the nozzle, each rib extending roughly 90 degrees about the circumference. Each of these ribs is located a known distance above the lower end 20 of passage 18. Through the use of a supporting device 78 such as that shown in Figs. 5, 6, 7, and 8, the nozzle may be located with respect to the tank so that the entrance 20 to passage 18 may be set a predetermined distance below the tank top. In this manner, the signal may be given when the liquid has risen to a uniform predetermined level. The support 78 shown in Fig. 5 consists of a ringlike member having inwardly extending webs 80, the diameter between their curved inner surfaces being slightly greater than the diameter of the nozzle, but less than the diameter of the opposed ribs 76. Obviously, when the support 78 is turned with respect to nozzle 2 so that webs 80 are located between the ribs 76, support 78 may be moved up and down the nozzle. When the right elevation has been reached, support 78 may be rotated through 90 degrees with respect to the nozzle, whereupon the ribs 76 will engage webs 80, thereby limiting the movement of the support 78 with respect to the nozzle. Support 78 and the inwardly extending webs 80 are of sufficient diameter, as shown in Figs. 6 and 8, to engage the upper end of a filler neck 82 or the top of tank 84 without interfering with escape of gas from the tank. In this manner the lower end 20 of tube 18 may be located any desired distance below the tank top.

Another construction for locating the nozzle is shown in Figs. 11, 12, 17, and 18. The notches 86 appearing on the sides of the nozzle in Figs. 11 and 12 are merely lines indicating a desired distance above lower end 20 of passage 18. Additional notches or marks may be provided above or below notches 86 if other indications are desired. In Figs. 17 and 18 is shown a locating clamp 88, which may be easily applied to the nozzle and used in positioning the open end 20 of passage 18 a desired distance within the tank. The clamp consists of a generally circular band having its ends 90 and 92 bent outwardly as shown, to be drawn together by a nut and bolt 94. The length of ends 90 and 92 is sufficient to extend over the space between the nozzle and the filler neck or the tank opening so as to limit the entrance of the nozzle into the tank in the manner shown. Obviously other clamping means that would be readily shiftable along the nozzle could be used, and the form disclosed is merely illustrative of one type. To meet the requirements of a specific job, the nozzle might be provided with permanent extensions which could engage the tank top. Ordinarily, however, the adjustable form of stop is preferred.

Other variations of the constructional details will obviously present themselves once the broad elements of the invention have been disclosed, and it is not intended that the invention shall be limited in any way by the specific disclosures, but rather only by the appended claims.

I claim:

1. A liquid level indicator comprising a nozzle, a Venturi tube in said nozzle, an opening through the wall of said nozzle into said Venturi section, a first passageway connecting with said opening and extending downwardly along the side of said nozzle, terminating at a position where it may be reached by rising liquid level in the container with which said nozzle may be used, a second passageway connecting with said opening and extending downwardly along said nozzle a limited distance, a whistle in series with said second passageway and located far enough from said opening to permit limited travel of a ball that normally rests on the inner side of said whistle to prevent the flow of gas therethrough, said second passageway formed to permit adequate flow of gas therethrough when said ball has been moved from its position on said whistle to a position of greater passageway area, means for limiting the travel of said ball toward said opening, the loading of said ball being such that when said first passageway is open the negative pressure created in said second passageway will be insufficient to cause sufficient movement of said ball to permit the passage of enough gas through said whistle to create a signal, but upon the trapping of said first passageway by liquid, the negative pressure in said second passageway will be sufficient to move said ball to a position in said second passageway whereby gas will flow through said whistle in sufficient volume to produce an audible signal.

2. A liquid level indicator comprising a nozzle, an opening through the wall of said nozzle, first and second passageways leading from said opening, the first passageway extending downwardly with its lower open end located at any desired level with respect to the end of said nozzle, the second passageway leading to a gas operated audible signaling device, a pressure operable valve located to obstruct the flow of gas through said signaling device and to render said device inoperative, means fixed with respect to said nozzle for creating a continuous negative pressure in said passageways during the normal flow of liquid through said nozzle, said valve so adjusted with respect to the negative pressure that is created in said second passageway during normal flow of liquid through said nozzle that said valve will not be moved thereby preventing said signaling device from functioning until said first passageway is trapped by rising liquid, but upon the trapping of said first passageway thereby causing the negative pressure in said second passageway to increase, said valve will move to a position whereby gas will enter said second passageway in such volume as to cause audible operation of said signaling device.

3. A liquid level indicator as set forth in claim 2, in which the audible signaling device comprises a whistle.

4. A liquid level indicator as set forth in claim 2, in which the audible signaling device comprises a reciprocating member which, when in operation, is capable of producing sufficient noise to give an audible signal.

5. A liquid level indicator comprising a nozzle, an opening through the wall of said nozzle, first and second passageways leading from said opening, the first passageway extending downward with its lower open end located at any desired level with respect to the end of said nozzle, the second passageway leading to a gas-operated audible signaling device, said device comprising a reciprocating member which, when in operation, is capable of producing sufficient noise to give an audible signal, means fixed with respect to said nozzle for creating a continuous negative pressure in said passageways during normal flow of liquid through said nozzle, said negative pressure being inadequate to draw gas through said signaling device in sufficient quantity to produce a signal so long as said first passageway is open, but upon trapping of said first passageway by rising liquid, the negative pressure in said second passageway will increase sufficiently to draw gas through said second passageway in such volume as to cause audible operation of said signaling device.

6. A liquid level indicator comprising a nozzle, an opening through the wall of said nozzle, first and second passageways leading from said opening, the first passageway extending downwardly with its lower open end located at any desired level with respect to the end of said nozzle, the second passageway extending in a generally downward direction and having positioned therein a whistle, means fixed with respect to said nozzle for creating a continuous negative pressure in said passageways during normal flow of liquid through said nozzle, a valve normally closing said whistle and loaded sufficiently to maintain said whistle closed and inaudible when said first passageway is open and liquid is flowing through said nozzle in normal amount, but when said first passageway is sealed by rising liquid and the pressure in said second passageway is increased said valve will open, thereby increasing the flow through said whistle in sufficient volume to produce an audible signal.

7. A liquid level indicator as set forth in claim 2 in which the means fixed with respect to said nozzle for creating a continuous negative pressure in said passageways during the normal flow of liquid through said nozzle comprises a baffle extending transversely of said nozzle immediately above said opening.

8. A liquid level indicator as set forth in claim 2 in which the means fixed with respect to said nozzle for creating a continuous negative pressure in said passageways during the normal flow of liquid through said nozzle comprises a Venturi tube in said nozzle, with the opening of said Venturi tube connecting with said first and second passageways.

9. A liquid level indicator comprising a nozzle, an opening through the wall of said nozzle, first and second passageways leading from said opening, the first passageway extending downwardly with its lower open end located at any desired level with respect to the end of said nozzle, the second passageway having therein a whistle, means fixed with respect to said nozzle for creating a continuous negative pressure in said passageways during normal flow of liquid through said nozzle, said means comprising a Venturi tube with the Venturi opening connecting with said first and second passageways, said whistle being closed by a valve loaded sufficiently to maintain said whistle inoperative so long as said first passageway is open, but when the negative pressure in said second passageway is increased by the closing of the open end of said first passageway through the rising of the liquid level said loaded valve will be moved by said increased negative pressure sufficiently to permit the flow of gas through said whistle to cause an audible signal.

10. A liquid level indicator, comprising a nozzle, an opening through the wall of said nozzle, first and second passageways leading from said opening, the first passageway extending downwardly with its lower open end located at any desired level with respect to the end of said nozzle, the second passageway extending generally downward and having a whistle in series therewith, a ball valve normally closing the interior side of said whistle, means for guiding said ball valve along said second passageway to a position where gas may flow freely through said whistle, means fixed with respect to said nozzle for creating a continuous negative pressure during normal flow of liquid through said nozzle, the negative pressure normally present in said passageways during flow of liquid through said nozzle being insufficient to move said ball valve from its normal closed position against said whistle so long as said first passageway is open, whereby no audible signal will be produced, but upon trapping of said first passageway by rising liquid, with the corresponding increase in the negative pressure in said second passageway, said ball valve will move from said closed position and gas will flow through said whistle in sufficient volume to produce an audible signal.

11. A liquid level indicator comprising a nozzle, an opening through the wall of said nozzle, first and second passageways leading from said opening, the first passageway extending downwardly with its lower open end located at any desired level with respect to the end of said nozzle, the second passageway connecting with the atmosphere by means of two ports, both of said ports being normally closed by gravity operated valves, the first valve opening toward the interior of said second passage upon the development of sufficient negative pressure in said second passage, the second valve opening toward the exterior of said passage, means fixed with respect to said nozzle for creating a continuous negative pressure in said passageways during normal flow of liquid through said nozzle, the negative pressure normally present in said passageways during said normal flow of liquid being insufficient to open said first valve in said second passageway, but upon trapping of said first passage by rising liquid, the negative pressure in said second passage will increase sufficiently to open said first valve, the valves in said second passage being so located with respect to each other that when said first valve is opened after the trapping of said first passageway with the corresponding increase in negative pressure in said second passageway, the movement of said first valve will cause opening of said second valve, thereby substantially decreasing the negative pressure in said second passageway, so that both valves will return to their original closed positions until the negative pressure in the second passageway again increases to cause through operation of said first valve, the alternate movement of said valves producing an audible signal.

12. A liquid level indicator comprising a nozzle, an opening through the wall of said nozzle, first and second passageways leading from said opening, the first passageway extending downwardly with its lower open end located at any desired level with respect to the end of said nozzle, said second passageway comprising a tubular extension leading from said opening, a whistle supported in said extension, a guideway running in an upward direction from the interior side of said whistle, a ball in said guideway normally closing the interior side of said whistle, means for preventing the escape of said ball from said guideway, means fixed with respect to said nozzle for creating a continuous negative pressure in said passageways during the normal flow of liquid through said nozzle, the negative pressure normally present in said passageways during said normal flow of liquid being inadequate to raise said ball from its normal position against said whistle, whereby no audible signal will be produced, but upon trapping of said first passage by rising liquid, the negative pressure in said second passage will increase sufficiently to raise said ball from said whistle and gas will flow through said whistle in sufficient volume to produce an audible signal.

FRANK P. SCULLY.